(12) United States Patent
Crooks (10) Patent No.: US 9,911,112 B2
(45) Date of Patent: Mar. 6, 2018

(54) CONTINUOUS SHRINK REDUCTION SYSTEM SENSITIVITY ADJUSTMENT

(71) Applicant: NCR Corporation, Duluth, GA (US)

(72) Inventor: John Crooks, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 313 days.

(21) Appl. No.: 14/726,426

(22) Filed: May 29, 2015

(65) Prior Publication Data

US 2016/0350738 A1 Dec. 1, 2016

(51) Int. Cl.
| | |
|---|---|
| *G06Q 20/00* | (2012.01) |
| *G06Q 40/00* | (2012.01) |
| *G06K 9/00* | (2006.01) |
| *G06Q 20/20* | (2012.01) |
| *G06Q 30/00* | (2012.01) |

(52) U.S. Cl.
CPC ....... *G06Q 20/208* (2013.01); *G06K 9/00771* (2013.01); *G06Q 30/0185* (2013.01)

(58) Field of Classification Search
None
See application file for complete search history.

(56) References Cited

U.S. PATENT DOCUMENTS

| 7,118,026 B2* | 10/2006 | Harris | G06Q 20/20 186/59 |
| 2002/0133721 A1* | 9/2002 | Adjaoute | G06Q 20/04 726/23 |
| 2009/0060259 A1* | 3/2009 | Goncalves | A47F 9/047 382/100 |
| 2013/0054438 A1* | 2/2013 | Boding | G06Q 20/4016 705/35 |
| 2016/0078444 A1* | 3/2016 | Tomasofsky | G06Q 20/40 705/44 |

* cited by examiner

*Primary Examiner* — Ariel J Yu
(74) *Attorney, Agent, or Firm* — Schwegman, Lundberg & Woessner (57) ABSTRACT

Various embodiments herein each include at least one of systems, methods, software, and devices, such as product scanners (e.g., barcode scanners), that continuously adjust fraud-detection sensitivity levels of fraud-detection processes. Adjustments of fraud-detection sensitivity levels are made to maximize actual fraud detection while also minimizing false detections based on changing environmental, transaction, and customer and employee behavioral conditions and factors.

16 Claims, 4 Drawing Sheets

CONTINUOUS SHRINK REDUCTION SYSTEM SENSITIVITY ADJUSTMENT

BACKGROUND INFORMATION

Retail shrink comes mostly from customer stealing, cashier sweet-hearting, and employee theft. Item substitution fraud occurring at Point-Of-Sale (POS) terminals, such as Self-Service Checkouts (SSCOs) and Cashier-Assisted Checkouts, is one of the key shrink issues. Perpetrators may commit the fraud in many ways such as by checking out an expensive item (e.g., a bottle of bourbon) as a cheap produce item (e.g., banana). For example, rather than scanning a barcode of an item, the item is placed on a scale, an item type is keyed in or otherwise selected such as bananas, and the item is priced at checkout by weight rather than by the product barcode. Data processing solutions have been implemented on computing devices at POS terminals to detect such possible occurrences of such item substitution fraud and other forms of fraud. However, a detection of possible occurrence of fraud is just that, a possible occurrence of fraud, as the detection is typically a probability of fraud rather than an absolute detection of fraud.

When a possibility of fraud occurrence is detected, a security event is typically triggered at the POS terminal of the occurrence. This may include one or more of locking the terminal until a monitoring employee is present, notification of a monitoring employee to watch the terminal closely, on-site or off-site review of video of the transaction, among other possible security events. Handling such security events can be time consuming and take personnel from performing other tasks and assisting other customers. As a detected possible occurrence of fraud is a probability and probability thresholds are used to determine when to declare a possible fraud occurrence, false detections are common. Such false detections can lead to wasted resource utilization investigating possible fraud occurrences, degradation of customer experiences, and employees learning to dismiss possible fraud notifications due to many false detections.

At the same time, a probability of fraud considered in view of a threshold may also lend such solutions to missed fraud detections. While an absolute detection of attempted fraud can be quite difficult, improvement of current fraud-detection solutions at POS terminals is desired.

SUMMARY

Various embodiments herein each include at least one of systems, methods, software, and devices, such as product scanners (e.g., barcode scanners), that continuously adjust fraud-detection sensitivity levels of fraud-detection processes. Adjustments of fraud-detection sensitivity levels are made to maximize actual fraud detection while also minimizing false detections based on changing environmental, transaction, and customer and employee behavioral conditions and factors.

One example embodiment is in the form of a method. This method includes adjusting at least one fraud-detection sensitivity threshold based on at least one threshold-setting rule. This method further includes performing fraud-detection processing with regard to items presented for purchase within a transaction at a POS terminal according to at least one fraud-detection process having at least one fraud-detection sensitivity threshold that is modified by the adjusting.

Another method embodiment includes performing fraud-detection processing with regard to items presented for purchase within a transaction at a POS terminal. The fraud-detection processing may be performed according to at least one fraud-detection process having at least one fraud-detection sensitivity threshold. This method further includes logging outputs of each of the at least one fraud-detection processes with regard to each item presented for purchase within the transaction. The method may then adjust at least one fraud-detection sensitivity threshold based on at least one threshold-setting rule and upon the adjusting, reevaluating, in the logged outputs, a result of at least one fraud-detection process with regard to at least one item presented for purchase within the transaction. This reevaluation may be performed to determine whether a previously presented item was possibly presented fraudulently.

One other example embodiment, in the form of a system, includes at least one processor and at least one memory device. The memory device stores an instruction set executable by at least one processor to perform data processing activities. The data processing activities include performing fraud-detection processing with regard to items presented for purchase within a transaction being conducted with the system according to at least one fraud-detection process having at least one fraud-detection sensitivity threshold. The data processing activities also include logging outputs in the at least one memory device of some or all of the at least one fraud-detection processes with regard to each item presented for purchase within the transaction. The data processing activities in some embodiments may adjust at least one fraud-detection sensitivity threshold based on at least one threshold-setting rule. In such embodiments, upon the adjusting of the at least one fraud-detection sensitivity threshold, the data processing activities may include reevaluating, in the logged outputs, a result of at least one fraud-detection process with regard to at least one item presented for purchase within the transaction to determine whether a previously presented item was possibly presented fraudulently.

DETAILED DESCRIPTION

Various embodiments herein each include at least one of systems, methods, software, and devices, such as product scanners (e.g., barcode scanners), that continuously adjust fraud-detection sensitivity levels of fraud-detection processes. Such fraud-detection processes are executed with regard to transactions conducted on POS terminals within one or more of product scanners, computing devices of POS terminals, and elsewhere such as on one or more servers. Adjustments of fraud-detection sensitivity levels are made to maximize actual fraud detection while also minimizing false detections based on changing environmental, transaction, and customer and employee behavioral conditions and factors.

Fraud-detection processes typically do not identify fraud occurrences with absolute certainty. Instead, fraud-detection processes evaluate one or more data elements representative of transaction events, images, items presented for or with regard to a purchase, environmental data, and other data elements. Such data elements may be considered by one or more fraud-detection processes in identifying fraud. Fraud-detection processes typically evaluate one or more of these data elements to determine a probability of fraud and then consider the probability in view of a threshold to identify probabilities of fraud that violate the threshold. When such a threshold is violated, a security event may be triggered to prevent the fraud, such as freezing a POS terminal until a supervisor clears the freeze, or notifying employees to monitor the transaction at the POS terminal. However, when the threshold is too sensitive, many false security events may be triggered. At the same time, when the threshold is not sensitive enough, store shrinkage increases. As these thresholds are static, there may be times when there are too many security events while at other times there may be too few security events.

In some embodiments, some of these same data elements considered by fraud-detection processes and other factors may be considered as overall indicators of fraud potential with regard to a specific transaction or with regard to all transaction and one or more POS terminals. These data elements and other factors are utilized in some embodiments to adjust sensitivity fraud-detection process thresholds. The data elements and other factors may be the subject of one or more fraud-detection processing threshold-setting rules, generally referred to herein as threshold-setting rules.

For example, fraud may be less likely at times when primary shoppers at a grocery store are retired adults and stay-at-home parents, such as between 9:00 AM and 2:30 PM on weekdays. Conversely, fraud potential may be more likely at times when party supplies are purchased, such as between 7:00 PM and 2:00 AM on weekends and holidays. Fraud may also be considered less likely within a transaction when certain products are being purchased, such as shitake mushrooms that may sell at $16.00 per pound, as opposed to other products that might be more likely associated with potential fraud, such as bananas that may sell for 50 cent per pound. Such data elements and other factors may be considered individually or in combination by one or more threshold-setting rules. In operation, threshold-setting rules may be continuously applied in real time as a POS terminal transaction is being conducted, periodically, randomly, or on a scheduled or manual basis. The threshold-setting rules determine likelihood for potential fraud and each adjust one or more fraud-detection process thresholds accordingly to increase or decrease fraud-detection sensitivity. Adjustments of fraud-detection process thresholds may be made directly by threshold-setting rules in some embodiments and indirectly in other embodiments. For example, an indirect setting of a fraud-detection process threshold may be made by setting an overall fraud potential setting to a value such as high, medium, or low. The overall high, medium, and low settings may be mapped to one or more fraud-detection processes in configuration data and upon an overall change, another process may directly manipulate the fraud-detection process thresholds.

The threshold-setting rules, in some embodiments, may be preconfigured by a vendor of such solutions. In some embodiments, the threshold-setting rules may be defined manually. In further embodiments, threshold-setting rules may be the subject of a subscription to a service that periodically updates threshold-setting rules through software update or manual servicing. Other embodiments may include a combination of two or more of such solutions, among other possibilities.

Such adjustments of fraud-detection sensitivity levels are made automatically based on changing environmental, transaction, and customer and employee behavioral conditions and factors. Continuous fraud-detection sensitivity adjustment maximizes actual fraud detection while also minimizing false detections.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
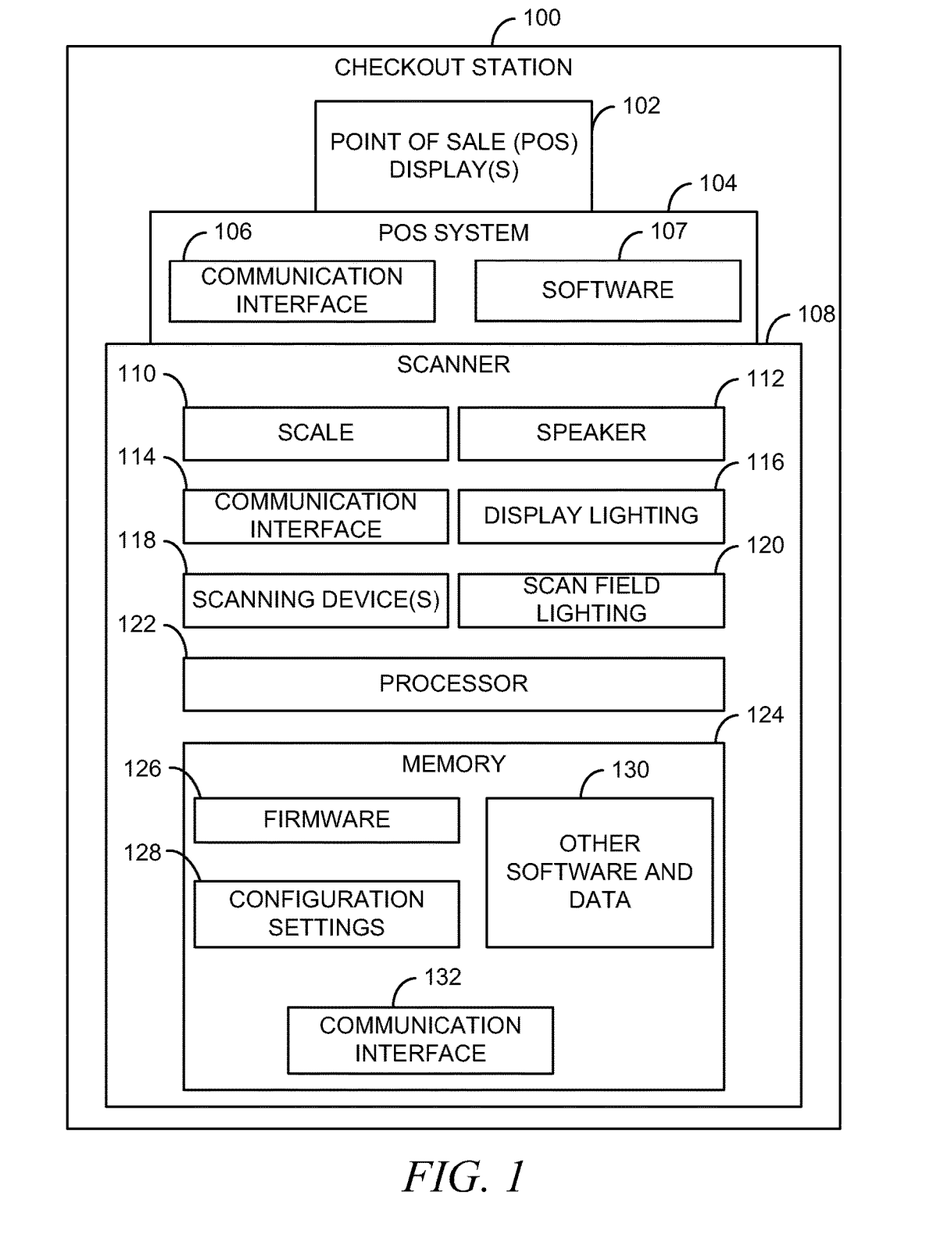
FIG. 1 is a diagram illustrating components of a checkout station having a scanner, according to an example embodiment.

FIG. 1 is a diagram illustrating components of a checkout station 100 including a POS system 104 and scanner 108, according to an example embodiment. It is to be noted that the checkout station 100 is shown schematically in greatly simplified form, with example components relevant to understanding various embodiments herein. The same situation may be true for the other various components of the checkout station 100. Also, note that the checkout station 100 may include more or fewer components in some embodiments.

Furthermore, the various components included in FIG. 1 as illustrated and arranged are provided for illustration purposes only. It is to be noted that other arrangements with more or fewer components are possible without departing from the contributions herein, in particular with regard to continuous shrink reduction system sensitivity adjustment.

Moreover, the methods, POS terminal 104, and scanner 108 presented herein and below may include all or some combination of the components shown in the context of the checkout station 100. Further, although a checkout station 100 is illustrated as including a scanner 108, the scanner 108 may be a standalone element or an element of other systems, devices, and terminals in other embodiments. Examples of other terminal-types that may include a scanner 108 are self-service terminals (SSTs) such as SSCO terminals, POS terminals, clerk operated and self-service library checkout stations, time-keeping terminals, and the like. Additionally, references to POS terminals herein and in the claims are general references to both POS and SSCO terminals, unless expressly stated otherwise.

The methods of some embodiments are programmed as executable instructions stored in memory and/or non-transitory computer-readable storage media and executed on one or more processors associated with the components and devices herein.

The checkout station 100 includes one or more POS displays 102 that present information of a POS system 104 coupled to the one or more POS displays 102. Information presented by the one or more POS displays 102 includes information relevant in a retail context and with regard to operation of the checkout station 100. The checkout station 100 also includes the scanner 108.

The scanner 108 may be referred to as a barcode scanner or product scanner as those are the tasks most commonly associated with such devices. During operation of the checkout station 100, items are placed within a scan field of the scanner 108. One or more scanning devices 118 of the scanner 108, such as one or more cameras and laser scanners then scan a barcode and information read therefrom is communicated to the POS system 104. The POS system 104 then uses that data to identify the item placed within the scan field of the scanner 108 and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. Each scan field may include one or more imaging devices 118, such as cameras. In some embodiments, a total of four or more cameras may be included in one or both of the scan fields, combined. In addition to the scanning devices 118, the scanner 108 may include various other components. The various other components may include an integrated scale 110 such as may be used in a grocery outlet to weigh items such as produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned. The scanner 108 also includes one or more of at least one of a hardware communication interface 114 or a software or firmware communication interface 132 that enables to scanner to communicate with at least the POS system 104 communication interface 106 and, in some embodiments, over a network.

During typical operation, the scanner 108 is operated according to instructions executed on a processor 122. The processor may be a single or multi-core ASIC, digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), and other memory and data storage types and devices. The additional function may also include one or more fraud-detection process that declares security events in view of one or more fraud-detection thresholds at the checkout station 100. Security events may freeze user interaction capabilities with the POS system 104 and scanner 108 that must be cleared before proceeding, sending a security message to another terminal or a computing or communication device of an employee having security or supervision responsibilities, and the like.

Instructions of software 107 that control operation of the POS system 107 may be stored in a memory device of the POS system and may include one or both of fraud-detection processes and threshold adjustment rules, and processes that implement the fraud-detection rules.

Instructions that control operation of the scanner 108 may be stored in firmware 126 or as software 130 in memory 124. These instructions are typically executed according to configuration settings stored in the memory 124. The instructions may execute in view of configuration settings 128, which may also configure operation of the scanner 108 and the various components therein. For example, the configuration settings 108 may configure speaker 112 volume, display lighting 116 outputs, scan field lighting 120 brightness, decoding algorithm of the scanning device(s) 118 and the instructions, one or more communication protocols used to communicate data from the scanner 108 to the POS system 104, such as via a wired or wireless communication interface 106 of the POS system 104, scale 110 operating parameters (e.g., unit of measure as pounds or kilograms), among other configuration settings the particular scanner 108 of an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner. The software 130 may also include one or more fraud-detection processes that are executed on the scanner 108.

The fraud-detection processes typically include one or more threshold settings that may be stored in the memory 124, such as with the configuration settings 128. In some embodiments, the configuration settings 128 stored in the scanner 108 memory 124 may include configuration settings 128 for one or more item substitution fraud-detection processes, among other fraud-detection processes. Item substitution fraud is merely one example fraud type that may be detected in some embodiments. An example of item substitution fraud is, rather than scanning a barcode of an item, the item is placed on a scale, an item type is keyed in or otherwise selected such as bananas, and the item is priced at checkout by weight rather than by the product barcode. Data processing solutions may be implemented in some embodiments to detect possible occurrences of such item substitution fraud at POS terminals, among possible occurrences of other types of fraud. However, a detection of possible occurrence of fraud is just that, a possible occurrence of fraud, as the detection is typically a probability of fraud rather than an absolute detection of fraud.

The one or more item substitution fraud-detection processes are stored as software 130 or firmware 126 within the memory 124 or other device within the scanner 108. The item substitution fraud-detection processes are typically triggered for execution upon receipt of a command from the POS system 104, such as upon receipt of input into the POS system 104 to weigh a presented item on the scale 110. The item substitution fraud-detection processes, which may be executed by the processor 122, operate against images received from the one or more scanning device 118 cameras. The item substitution fraud-detection processes may be defined in the software 130 or firmware 126. In some embodiments, the item substitution fraud-detection processes are generic processes that may be flexibly configured within the configuration settings 128. For example, some embodiments may include one or more item substitution fraud-detection processes that are simply defined within the software 130 when the software 130 is authored. Some of these processes may be modified through the configuration settings 128. One such configuration setting may be a threshold setting that is adjustable to modify a sensitivity of the one or more item substitution fraud-detection processes. In some other embodiments, the item substitution fraud-detection processes are a collection of different processes in the software 130 or firmware 126 that may be linked together by configuration settings 128 to form larger, conditional item substitution fraud-detection processes. Regardless of the form and configuration of the item substitution fraud-detection processes, the item substitution fraud-detection processes generally process images captured by scanning device 118 cameras to identify features of presented items represented therein. In some embodiments, the item substitution fraud-detection processes operate to determine whether a presented item is a manmade item or a produce item.

Determining whether an item is manmade generally includes identifying features in images that rarely, if ever, occur in natural products, such as produce. Such features may include straight lines, parallel lines, certain shape silhouettes, glare or an amount or size of glare occurrences, among other features.

Figure 2:
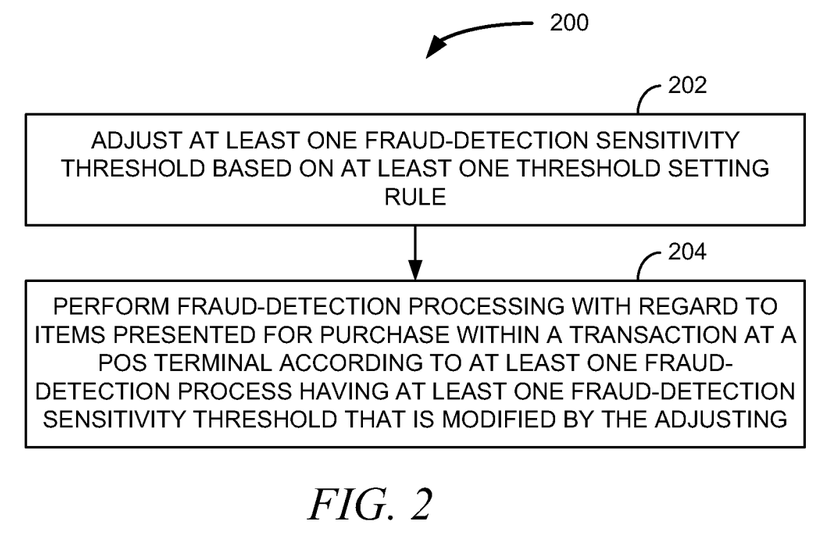
FIG. 2 is a logical block diagram of a method, according to an example embodiment.

FIG. 2 is a logical block diagram of a method 200, according to an example embodiment. The method 200 is an example of a continuous shrink reduction system sensitivity adjustment method that is performed to adjust one or more fraud-detection sensitivity thresholds of one or more fraud-detection processes. The method 200 may be executed in whole or in part on a POS terminal, on a scanner, or on one or more servers accessible by one or both of the POS terminal and scanner via a network.

The method 200 includes adjusting 202 at least one fraud-detection sensitivity threshold based on at least one threshold-setting rule. The method 200 also includes performing 204 fraud-detection processing with regard to items presented for purchase within a transaction at a POS terminal according to at least one fraud-detection process having at least one fraud-detection sensitivity threshold that is modified by the adjusting 202.

In some method 200 embodiments, at least one fraud-detection process includes processing images captured by one or more cameras of a product scanner coupled to the POS terminal to determine whether an item presented for purchase captured within at least one image has properties consistent with an item of a barcode read from the item by the product scanner. In such embodiments, the processing of the image provides an output measure of a likely match and an output indication of a match based on the output of a likely match in view of a fraud-detection sensitivity threshold. This fraud-sensitivity threshold is an example of a fraud-sensitivity threshold that is subject to adjustment 202. Note that in some embodiments of the method 200, the image processing fraud-detection process may execute on the scanner while other portions of the method 200 may execute on the POS terminal or elsewhere.

In some image processing fraud-detection process embodiments of the method, the determination of whether an item presented for purchase captured has properties consistent with an item of a barcode includes processing at least one image captured by a camera of the product scanner to obtain a measurement of how likely the item is man-made. In such embodiments, the method 200 may declare the presented item as man-made or a produce item based on the measurement of how likely the item is man-made in view of a particular fraud-detection sensitivity threshold that is subject to the adjusting.

Some embodiments of the method 200 further include logging outputs of each of the at least one fraud-detection processes with regard to each item presented for purchase within the transaction. Subsequently, upon the adjusting 202 of the at least one fraud-detection sensitivity threshold, the method 200 may reevaluate, in the logged outputs, a result of at least one fraud-detection process with regard to at least one item presented for purchase within the transaction to determine whether a previously presented item was possibly presented fraudulently. When this reevaluating identifies possible fraud, the method 200 may trigger a fraud prevention process, such as a security event described above.

In various embodiments, the method may adjust fraud-detection sensitivity by adjust one or more threshold of one or more fraud detection processes. Fraud detection sensitivity may be adjusted in such embodiments through threshold-setting rules. A threshold-setting rule typically considers one or more data and environmental factors with each factor including a value. Threshold-setting rules then adjust at least one fraud-detection sensitivity threshold based on one or more of a specific data factor value, a sum of data factor values, a sum of a subset of data factor values. Threshold-setting rules also, or alternatively, adjust at least one fraud-detection sensitivity threshold based on one or more of a sum of scores associated with each of a plurality of data factor values, a sum of scores associated with each of a subset of the plurality of data factor values, and a sum of a subset of data factor values.

Factors utilized by threshold-setting rules, among others, may include one or more of a current time of day, a day of the week, a manually input of a data factor, and one or more data factors provided as input by a third-party via a network. The factors may also include a data value representative of a notice provided to a POS terminal attendant, one or a combination of specific items presented for purchase at the POS terminal, and a presented payment type such as cash, credit, or check. The factors may additionally include a number of items presented for purchase at the POS terminal, a price per unit of weight of an item presented for purchase at the POS terminal, and an age of a customer. The age of the customer may be predicted in such embodiments through one or more of image processing, from an age or date of birth associated with a customer loyalty identifier presented at the POS terminal or as represented on an identification card presented at the POS terminal. Other factors may include conformity of time between product presentment at the POS terminal with an expected or average scan speed within a transaction, at the terminal, or an employee operating the terminal. Another of such factors may be a number of individuals present at the POS terminal as identified via image processing of images captured by at least one a camera of a product scanner of the POS terminal and a camera having a view of an area surrounding the POS terminal.

Some embodiments of the method 200 also maintain a database storing possible fraud reputation values associated with known individuals. Some such embodiments include a threshold-setting rule that adjusts at least one fraud-detection sensitivity threshold based on a possible fraud reputation value stored in the database of an individual associated with a transaction at the POS terminal. In one such embodiment of the method 200, the at least one individual associated with the transaction is identified based on at least one of an employee logged into the POS terminal, an employee known to be monitoring the POS terminal, a customer identified by presentment of a customer loyalty identifier, and a payment mode known in stored data to be associated with a customer having a possible fraud reputation value stored in the database. The known payment mode may be a checking account routing and account number, a credit card number, or other such payment mode. Such payment mode data may be stored by an entity performing the method 200 or stored by another entity providing a data service with such data.

In some embodiments, adjusting 202 the at least one fraud-detection sensitivity threshold includes setting a fraud-sensitivity level amongst a plurality of defined fraud-sensitivity levels. Each of the defined fraud sensitivity levels is typically associated with at least one fraud-sensitivity level threshold setting. Setting the fraud-sensitivity level in such embodiments may automatically invoke a process that modifies each fraud-sensitivity level threshold associated with the defined fraud-sensitivity level being set. Some such embodiments further include adjusting 202 an individual fraud-detection sensitivity threshold.

However, it is possible in some embodiments for threshold-setting rules to conflict with one another. In some embodiments, prior to adjusting a fraud-detection sensitivity threshold according to a threshold-setting rule or a defined fraud sensitivity level, the method 200 may determine whether a current fraud-detection sensitivity threshold setting conforms to another threshold-setting rule or defined fraud-sensitivity level. When there is a lack of conformity, some embodiments may adjust the fraud-detection sensitivity threshold only when the new setting would provide greater sensitivity in detecting fraud where greater sensitivity to fraud increases a detection likelihood of possible fraud. Other embodiments may be configured conversely.

Figure 3:
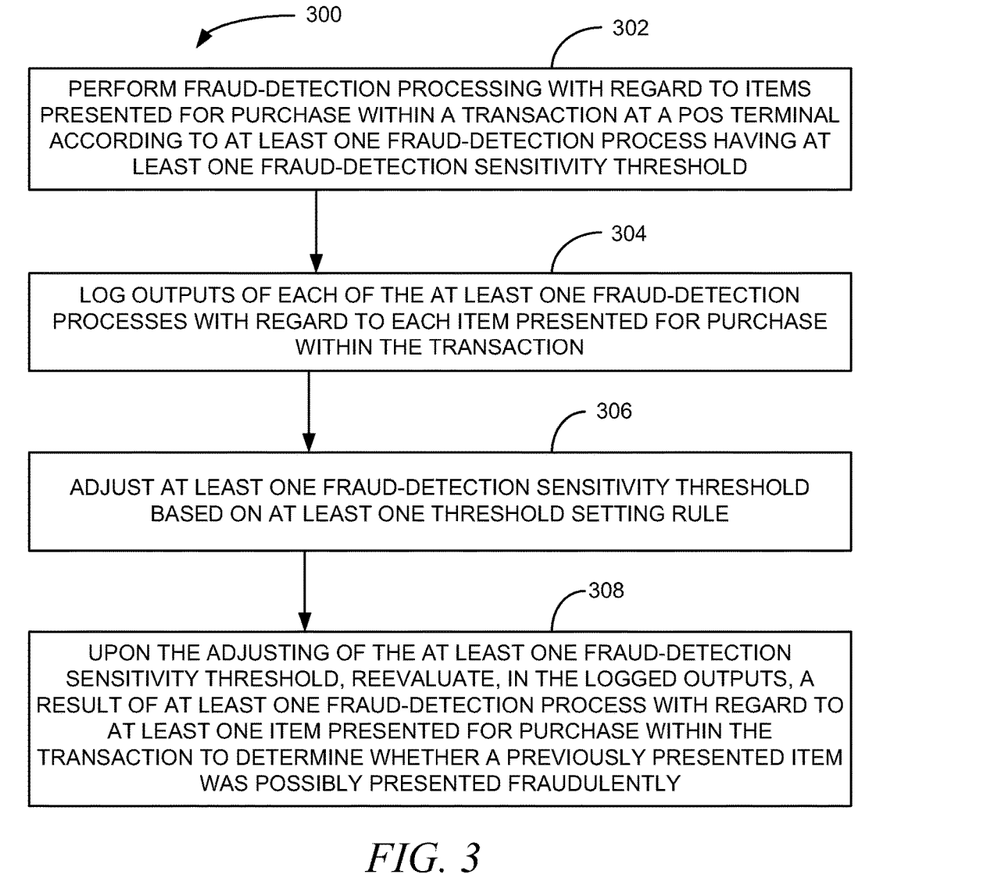
FIG. 3 is a logical block diagram of a method, according to an example embodiment.

FIG. 3 is a logical block diagram of a method, according to an example embodiment. The method 300 is another example of a continuous shrink reduction system sensitivity adjustment method that is performed to adjust one or more fraud-detection sensitivity thresholds of one or more fraud-detection processes. The method 300 may also be executed in whole or in part on a POS terminal, on a scanner, or on one or more servers accessible by one or both of the POS terminal and scanner via a network.

The method 300 includes performing 302 fraud-detection processing with regard to items presented for purchase within a transaction at a POS terminal according to at least one fraud-detection process having at least one fraud-detection sensitivity threshold. The method 300 further logs 304 outputs of at least some of the at least one fraud-detection processes with regard to each item presented for purchase within the transaction and adjusts 306 at least one fraud-detection sensitivity threshold based on at least one threshold-setting rule. Upon adjustment 306 of the at least one fraud-detection sensitivity threshold, some embodiments of the method 300 include reevaluating 308, in the logged 304 outputs, a result of at least one fraud-detection process with regard to at least one item presented for purchase within the transaction. The reevaluation 308 is performed to determine whether a previously presented item was possibly presented fraudulently in view of the at least one fraud-detection sensitivity threshold adjustment 306. In such embodiments, when the reevaluating 308 identifies possible fraud, the method 300 may trigger a fraud prevention process, such as a security event described above.

Figure 4:
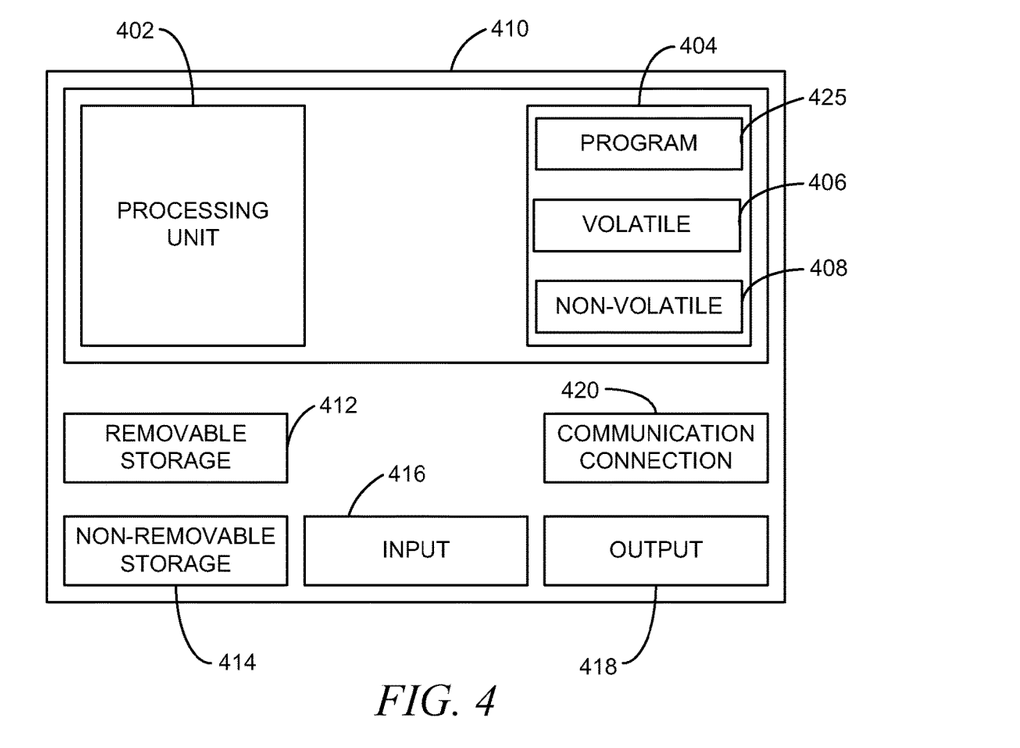
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. The computing device, in some embodiments, is a computing device of a POS terminal, such as the POS system 104 of FIG. 1. In other embodiments, the computing device is a mobile device implemented as or as part of a POS terminal.

An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium. In some embodiments, the computer-readable instructions include one or both of fraud-detection processes, threshold-setting rules, processes that are executable to apply the threshold-setting rules, and make changes to threshold of the fraud-detection processes.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   adjusting at least one fraud-detection sensitivity threshold based on at least one threshold-setting rule;
   performing fraud-detection processing with regard to items presented for purchase within a transaction at a point-of-sale (POS) terminal according to at least one fraud-detection process having at least one fraud-detection sensitivity threshold that is modified by the adjusting; and
   wherein:
      one of the at least one fraud-detection processes includes processing images captured by one or more cameras of a product scanner coupled to the POS terminal to determine whether an item presented for purchase captured within at least one image has properties consistent with an item of a barcode read from the item by the product scanner, the processing providing an output measure of a likely match and an output indication of a match based on the output of a likely match in view of a fraud-detection sensitivity threshold; and
      the determination of whether an item presented for purchase captured within at least one image has properties consistent with an item of a barcode read from the item by the product scanner includes:
         processing at least one image captured by a camera of the product scanner to obtain a measurement of how likely the item is man-made;
         declaring the presented item as man-made or a produce item based on the measurement of how likely the item is man-made in view of a particular fraud-detection sensitivity threshold that is subject to the adjusting.

2. The method of claim 1, further comprising:
   logging outputs of each of the at least one fraud-detection processes with regard to each item presented for purchase within the transaction;
   upon the adjusting of the at least one fraud-detection sensitivity threshold, reevaluating, in the logged outputs, a result of at least one fraud-detection process with regard to at least one item presented for purchase within the transaction to determine whether a previously presented item was possibly presented fraudulently; and
   when the reevaluating identifies possible fraud, triggering a fraud prevention process.

3. The method of claim 1, wherein the at least one threshold-setting rule includes a threshold-setting rule that considers one or more data factors with each data factor including a value and adjusts the at least one fraud-detection sensitivity threshold based on at least one of:
   a specific data factor value;
   a sum of data factor values;
   a sum of a subset of data factor values;
   a sum of scores associated with each of a plurality of data factor values; and
   a sum of scores associated with each of a subset of the plurality of data factor values; and
   a sum of a subset of data factor values.

4. The method of claim 3, wherein the at least one data factors include at least one of:
   a current time of day;
   a manual input of a data factor;
   one or more data factors provided as input by a third party via a network;
   a data value representative of a notice provided to a POS terminal attendant;
   one or a combination of specific items presented for purchase at the POS terminal;
   a presented payment type;
   a number of items presented for purchase at the POS terminal;
   a price per unit of weight of an item presented for purchase at the POS terminal;
   an age of a customer as predicted through image processing, determined from an age or date of birth associated with a customer loyalty identifier presented at the POS terminal, or determined from an age or date of birth represented on an identification card presented at the POS terminal;
   conformity of time between product presentment at the POS terminal with an expected or average scan speed with regard to at least one of the transaction, the terminal, and an employee operating the terminal; and
   a number of individuals present at the POS terminal as identified via image processing of images captured by at least one a camera of a product scanner of the POS terminal and a camera having a view of an area surrounding the POS terminal.

5. The method of claim 1, further comprising:
   maintaining a database including possible fraud reputation values associated with known individuals; and
   wherein the at least one threshold-setting rule includes a threshold-setting rule that adjusts at least one fraud-detection sensitivity threshold based on a possible fraud reputation value stored in the database of an individual associated with a transaction at the POS terminal.

6. The method of claim 5, wherein the at least one individual associated with the transaction is identified based on at least one of an employee logged into the POS terminal, an employee known to be monitoring the POS terminal, a customer identified by presentment of a customer loyalty identifier, and payment mode known in stored data to be associated with a customer having a possible fraud reputation value stored in the database.

7. The method of claim 1, wherein adjusting the at least one fraud-detection sensitivity threshold includes setting a fraud-sensitivity level amongst a plurality of defined fraud-sensitivity levels, each defined fraud sensitivity level associated with at least one fraud-sensitivity level threshold setting, and wherein setting the fraud-sensitivity level automatically invokes a process that modifies each fraud-sensitivity level threshold associated with the defined fraud-sensitivity level being set.

8. The method of claim 7 wherein:
adjusting the at least one fraud-detection sensitivity threshold further includes adjusting an individual fraud-detection sensitivity threshold; and
prior to adjusting a fraud-detection sensitivity threshold according to a threshold-setting rule or a defined fraud sensitivity level, determine whether a current fraud-detection sensitivity threshold setting conforms to another threshold-setting rule or defined fraud-sensitivity level; and
when the current fraud-detection sensitivity threshold setting does not conform to another threshold-setting rule or defined fraud-sensitivity level, adjusting the fraud-detection sensitivity threshold only when the new setting would provide greater sensitivity in detecting fraud, wherein greater sensitivity to fraud increases a detection likelihood of possible fraud.

9. A method comprising:
performing fraud-detection processing with regard to items presented for purchase within a transaction at a point-of-sale (POS) terminal according to at least one fraud-detection process having at least one fraud-detection sensitivity threshold;
logging outputs of each of the at least one fraud-detection processes with regard to each item presented for purchase within the transaction;
adjusting at least one fraud-detection sensitivity threshold based on at least one threshold-setting rule;
upon the adjusting of the at least one fraud-detection sensitivity threshold, reevaluating, in the logged outputs, a result of at least one fraud-detection process with regard to at least one item presented for purchase within the transaction to determine whether a previously presented item was possibly presented fraudulently;
wherein one of the at least one fraud-detection processes includes:
processing images captured by one or more cameras of a product scanner coupled to the POS terminal to determine whether an item presented for purchase captured within at least one image has properties consistent with an item of a barcode read from the item by the product scanner by:
processing at least one image captured by a camera of the product scanner to obtain a measurement of how likely the item is man-made; and
declaring the presented item as man-made or a produce item based on the measurement of how likely the item is man-made in view of a particular fraud-detection sensitivity threshold that is subject to the adjusting; and
outputting an indication of a match based on a comparison of the man-made/produce item declaration in view of a man-made/produce item property associated with the item of the read barcode.

10. The method of claim 9 wherein when the reevaluating identifies possible fraud, the method further comprises:
triggering a fraud prevention process.

11. The method of claim 9, wherein the at least one threshold-setting rule includes a threshold-setting rule that considers one or more data factors with each data factor including a value and adjusts the at least one fraud-detection sensitivity threshold based on at least one of:
a specific data factor value;
a sum of data factor values;
a sum of a subset of data factor values;
a sum of scores associated with each of a plurality of data factor values; and
a sum of scores associated with each of a subset of the plurality of data factor values; and
a sum of a subset of data factor values.

12. The method of claim 9, wherein at least one threshold-setting rule sets a fraud-detection sensitivity threshold based on at least one of:
a current time of day;
a manual input of a data factor;
one or more data factors provided as input by a third party via a network;
a data value representative of a notice provided to a POS terminal attendant;
one or a combination of specific items presented for purchase at the POS terminal;
a presented payment type;
a number of items presented for purchase at the POS terminal;
a price per unit of weight of an item presented for purchase at the POS terminal;
an age of a customer as predicted through image processing, determined from an age or date of birth associated with a customer loyalty identifier presented at the POS terminal, or determined from an age or date of birth represented on an identification card presented at the POS terminal;
conformity of time between product presentment at the POS terminal with an expected or average scan speed with regard to at least one of the transaction, the terminal and an employee operating the terminal;
a number of individuals present at the POS terminal as identified via image processing of images captured by at least one a camera of a product scanner of the POS terminal and a camera having a view of an area surrounding the POS terminal; and
a database including possible fraud reputation value associated with known individuals, wherein the at least one threshold-setting rule includes a threshold-setting rule that adjusts at least one fraud-detection sensitivity threshold based on a possible fraud reputation value stored in the database of an individual associated with a transaction at the POS terminal.

13. The method of claim 9, wherein adjusting the at least one fraud-detection sensitivity threshold includes setting a fraud-sensitivity level amongst a plurality of defined fraud-sensitivity levels, each defined fraud sensitivity level associated with at least one fraud-sensitivity level threshold setting, and wherein setting the fraud-sensitivity level automatically invokes a process that modifies each fraud-sensitivity level threshold associated with the defined fraud-sensitivity level being set.

14. A sytem comprising:
a camera-based product scanner, at least one processor and at least one memory device; and an instruction set accessible in the at least one memory device and executable by the at least one processor to perform data processing activities, the data processing activities comprising:
performing fraud-detection processing with regard to items presented for purchase within a transaction being conducted with the system according to at least one fraud-detection process having at least one fraud-detection sensitivity threshold, one of the at least one fraud-detection processes including:
processing images captured by one or more cameras of the product scanner coupled to determine whether an item presented for purchase captured within at least one image has properties consistent with an item of a barcode read from the item by the product scanner by:
processing at least one image captured by a camera of the product scanner to obtain a measurement of how likely the item is man-made; and
declaring the presented item as man-made or a produce item based on the measurement of how likely the item is man-made in view of a particular fraud-detection sensitivity threshold that is subject to the adjusting; and
outputting an indication of a match based on a comparison of the man-made/non-man-made item declaration in view of a man-made/non-man-made item property associated with the item of the read barcode;
logging outputs in the at least one memory device of each of the at least one fraud-detection processes with regard to each item presented for purchase within the transaction;
adjusting at least one fraud-detection sensitivity threshold based on at least one threshold-setting rule; and
upon the adjusting of the at least one fraud-detection sensitivity threshold, reevaluating, in the logged outputs, a result of at least one fraud-detection process with regard to at least one item presented for purchase within the transaction to determine whether a previously presented item was possibly presented fraudulently.

15. The system of claim 14, wherein at least one threshold-setting rule sets a fraud-detection sensitivity threshold held in the at least one memory device based on at least one of:

a current time of day;
a current date;
a manual input of a data factor;
one or more data factors provided as input by a third party via a network;
a data value representative of a notice provided to a POS terminal attendant;
one or a combination of specific items presented for purchase at the POS terminal;
a presented payment type;
a number of items presented for purchase at the POS terminal;
a price per unit of weight of an item presented for purchase at the POS terminal;
an age of a customer as predicted through image processing, determined from an age or date of birth associated with a customer loyalty identifier presented at the POS terminal or determined from an age or date of birth represented on an identification card presented at the POS terminal;
conformity of time between product presentment at the POS terminal with an expected or average scan speed with regard to at least one of the transaction, the terminal, and an employee operating the terminal;
a number of individuals present at the POS terminal as identified via image processing of images captured by at least one a camera of a product scanner of the POS terminal and a camera having a view of an area surrounding the POS terminal; and
a database including possible fraud reputation value associated with known individuals, wherein the at least one threshold-setting rule includes a threshold-setting rule that adjusts at least one fraud-detection sensitivity threshold based on a possible fraud reputation value stored in the database of an individual associated with a transaction at the POS terminal.

16. The method of claim 14, further comprising:
a network interface device; and
wherein at least one threshold-setting rule is set at least in part according to a data value received via the network interface device.

* * * * *